Patented June 9, 1953

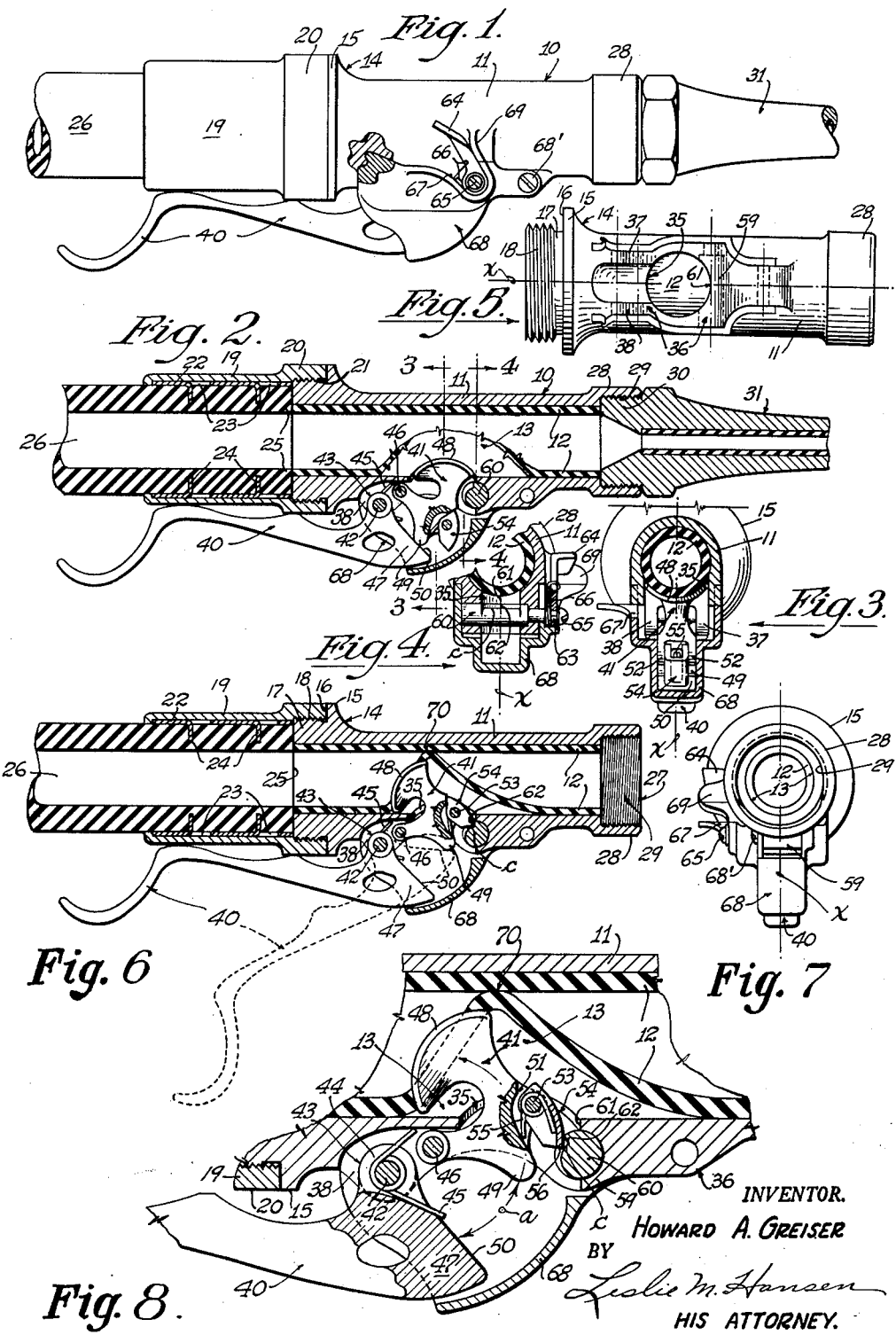
June 9, 1953   H. A. GREISER   2,641,087
REMOTE CONTROL VALVE FOR HEAVY DUTY SAND BLAST HOSE
Filed March 26, 1951
INVENTOR.
HOWARD A. GREISER
BY
Leslie M. Hansen
HIS ATTORNEY.

2,641,087

UNITED STATES PATENT OFFICE 2,641,087

REMOTE CONTROL VALVE FOR HEAVY DUTY SANDBLAST HOSE

Howard A. Greiser, San Jose, Calif.

Application March 26, 1951, Serial No. 217,508

9 Claims. (Cl. 51—12)

This invention relates to valves and more particularly to improvements in valves for sand blasting supply lines or hoses.

The present invention is to be used in conjunction with the discharge end of a flexible hose through which sand and compressed air are conveyed from a conventional compressor and sand generator. In this connection the device of the present invention is similar to the remote control valve described, disclosed and claimed in my copending application Serial No. 199,099 filed on December 4, 1950 in the United States Patent Office. However, in cases of the sandblast cleaning of castings and buildings or in cases of the ornamentation of exceptionally large areas of granite, marble and stone monuments and the like, heavier sandblast hose lines are required. It is with such heavy duty sandblast hose that the valve of the present invention is best suited.

It is one object of the present invention to provide a hand controlled cut-off valve for heavy duty, high pressure air lines.

Another object is to provide a lever actuated cut-off valve for heavy duty sandblasting hoses as close to the nozzle end thereof as possible for controlling the flow of air-sand mixture through such hoses at a point remote from the compressor and generator.

Other objects and advantages of the present invention will become apparent in the following specification when read in the light of the drawings, in which:

Fig. 1 is a side view of a remote control valve embodying the present invention.

Fig. 2 is a longitudinal section of the valve shown in Fig. 1.

Fig. 3 is a cross section of Fig. 2 taken substantially along line 3—3 thereof.

Fig. 4 is a fragmentary cross section of Fig. 2 taken substantially along line 4—4 thereof.

Fig. 5 is a bottom view of the main body only of the valve shown in Figs. 1 to 4 inclusive.

Fig. 6 is a longitudinal section similar to that of Fig. 2 with parts thereof shown in a different position and the nozzle removed.

Fig. 7 is an end view of the valve as seen in Fig. 6.

Fig. 8 is an enlarged fragmentary detail section of a portion of Fig. 6 with certain parts thereof more fully disclosed.

Referring now to the drawings, the valve of the present invention, generally designated 10, comprises a tubular body 11 forming a housing for a section of latex hose 12. The section of latex hose is very pliable and fits snugly against the inner passage 13 of the body 11 which protects the hose 12 and prevents it from expanding under normal internal operating pressure as will later become apparent.

One end 14 of the tubular body 11 has a flange formation 15 providing a shoulder 16 adjacent a relatively reduced nipple 17 provided with outside threading 18. An adapter sleeve 19 having one flanged end 20 provided with internal threading 21 is adapted to fit the threading 18 on the nipple 17. The sleeve 19 has an internal soft metal insert 22 prepunched as at 23 to provide tongues 24 adapted to be bent inwardly to clampingly engage the discharge end 25 of a sandblast hose 26. The hose 26 is generally of considerable length having its opposite end connected to a source of air and sand, not shown. It should here be noted that the internal diameter of the hose 26 can be of various dimensions and associated with a sleeve such as the one 19 to suit its diameter, such sleeve having an end flange 20 threaded to fit the nipple 17 to thereby hold such hose in sealed and axial abutment with the latex hose 12.

The opposite end 27 of the tubular body 11 has an enlarged flange 28 which is threaded internally as at 29 to receive the threaded nipple 30 of a nozzle 31.

Midway between its ends the tubular body 11 is provided with an opening 35 which is substantially of circular configuration when looking radially into the tubular body 11 from below (see Fig. 5). In this connection it will be noted that the body 11 is provided with bearing bosses 36 in a plane X coincident to the radial line on which the opening 35 is centered. The rearward portion of the bosses 36 consists of spaced depending flanges 37—38 bored transversely the plane X to provide trunnionlike mountings for a hand operated lever 40 and an independently movable stopper arm 41.

The lever 40 is pivotally mounted on a shaft 42 having its ends supported in bearings provided in the spaced flanges 37—38. As best seen in Fig. 8, the pivot portion 43 of the lever 40 comprises spaced bosses 44 between which a coil spring 45 is disposed on the shaft 42. One end of spring 45 bears against a recessed portion of the body 11 and the opposite end of the spring 45 bears against the lever 40 to maintain the latter in released or normal position against the periphery of the adapter sleeve 19, i. e., in substantial parallelism with the axis of the tubular body 11.

The stopper arm 41 is mounted for free floating action on a pintle 46 having its ends supported in bearings provided in the spaced flanges 37—38 slightly ahead of the bosses 44 on the fore end 47 of the lever 40. The stopper arm 41 has a padlike portion 48 which is of circular configuration to fit into the opening 35 and which pad 48 is of arcuate cross section to conform to the curve of the periphery of the latex hose 12 against which it rests.

It will be noted in Fig. 8 that the padlike portion 48 of the arm 41 is centered on an arc $a$ scribed from the axis of the pintle 46 and that the arm 41 is provided with a cam lug 49 segmentally spaced along arc $a$ from the pad 48 for engagement with a cam surface 50 provided on the fore end 47 of the hand operated lever 40. Consequently, it will be noted that when lever 40 is in its normal position its cam surface 50 acts as a stop for limiting further movement of the pad 48 out of alignment with the periphery of the body 11 in the region of the opening 35 therein. In this manner the hose 12 is normally supported in the region of the opening 35 to prevent bulging of the latex hose through the opening 35 when the internal pressure of the hose is increased. In other words, the pad 48 serves as a door or closure for the opening 35.

The arm 41 is provided with a recess 51 in its segmental periphery and a pair of spaced bearings 52 extend outwardly therefrom to receive the ends of a pin 53 having a latch means thereon in the form of a U-shaped pawl 54. A coil spring 55 is mounted on the pin 53 between the legs of the U-shaped pawl and one end of this spring 55 bears against the recess periphery of the arm 41 and the opposite end of spring 55 bears against the bight portion of the pawl 54 to urge the free end 56 of the pawl away from the periphery of the arm 41. However, the opposite end of the pawl 54 engages a portion of the periphery of the arm 41 to limit the extent to which the free end 56 of the pawl 54 can be moved beyond the arm 41.

The forward portion of the bosses 36 consists of a centrally located bearing 59 within which a keeper bolt 60 is mounted for turning movement about an axis transverse to the plane X. The axis of the bearing 59 is disposed substantially tangent to the circular opening 35 and is open as at 61 on its rearward side so as to expose a substantial portion of the periphery of the keeper bolt 60 for engagement by the extended pawl 54 when the arm 41 is swung toward the body 11. The keeper bolt 60 has a radially disposed shoulder 62 formed thereon and a portion of the main body of the bolt 60 is recessed on a gradually reduced radius so that the periphery of the bolt 60 is somewhat spiral in shape cross sectionally (see Fig. 8).

The keeper bolt 60 has a square head 63 at one end to receive a trigger lever 64 which is secured to the bolt 60 by a screw 65. A coil spring 66 encircles a reduced portion of the bolt 60 adjacent the trigger lever 64. One end of this spring 66 is hooked onto the lever 64 and the opposite end of this spring 66 lies against a flange 67 formed on a guard 68 which fits over the fore end 47 of lever 40, the stopper arm 41 and their associated operating mechanisms. The trigger lever 64 is thereby urged into a normal position against a stop wing 69 formed on the body 11 as best seen in Fig. 1. The cover 68 protects the bearings and actuating surfaces of the lever 40, arm 41, pawl 54 and keeper bolt 60. As best seen in Figs. 1, 3, 4 and 5 the guard 68 is secured to the body 11 by a suitable machine screw 68′ which extends into the forward portion of the bosses 36 on body 11.

When the trigger lever 64 is in its normal position, as above explained, the shoulder 62 formed on the keeper bolt 60 is substantially in alignment with the upper and rearward face 61 of the bearing 59. Consequently, when the lever 40 is swung away from the body 11 against the action of spring 45 so that the cam surface 50 of lever 40 forces the stopper arm 41 toward the body 11, the pawl 54 on arm 41 passes the recessed periphery of the keeper bolt 60 and the free end 56 of pawl 54 engages the crevice $c$ of the bolt 60 adjacent the shoulder 62 thereof (see Fig. 6). The padlike portion 48 of the stopper arm 41 is thus swung into the passage 13 of the tubular body 11 distorting the latex hose 12 to thereby pinch the same as at 70.

Although the pressure of the air and sand mixture within the sandblast hose 26 builds up behind the pinched portion 70 of the latex hose 12, the pad 48 is maintained in hose pinching position by reason of the abutment of pawl 54 against the keeper bolt 60. In this manner discharge of sand and air from the nozzle 31 is prevented. Meantime, the operating lever 40 is free to return to its normal position by action of its return spring 45.

When it is desired to open up the valve to allow discharge of sand-air mixture from the nozzle, the trigger lever 64 need only be depressed by the thumb of the hand in which the valve 10 is held. In other words, depression of trigger lever 64 rotates the keeper bolt counterclockwise as seen in Fig. 8 so that the shoulder 62 of the bolt 60 forces the pawl 54 against action of its spring 55 into the recess 51 on the periphery of the stopper arm 41. It should here be noted that the bight portion of pawl 54 is arcuate and therefore, once the free end 56 of the pawl is dislodged from the crevice $c$ the pawl will be further cammed into recess 51 as the pressure of air-sand mixture within the latex hose 12 forces the pad 48 and arm 41 toward their initial or normal position.

When the cam lug 49 of stopper arm 41 strikes the cam surface 50 on lever 40 further movement of the arm 41 is repelled and the padlike portion 48 of the arm 41 is again aligned with the tubular body 11 to plug up the opening 35 therein and thereby support the latex hose 12 in the region of the opening 35.

When the trigger lever 64 is released, its spring 66 causes it to return to normal position against the wing 69 formed integrally on the body 11. Since the lever 64 is keyed to the keeper bolt 60 the latter is also returned to its reset position in which its shoulder 62 is in substantial alignment with the rearward face 61 of the cutaway bearing boss 59. In this position the keeper bolt is again ready to latchingly receive the free end of the pawl 54 in the manner as hereinbefore explained.

While I have specifically described what I believe to be the best mode of carrying out the principle of my invention it will be apparent to those skilled in the art that various modifications and alterations thereof can be made without departing from the spirit of my invention. I therefore desire to avail myself of all modifications, alterations and variations as fairly come within the purview of the appended claims.

What I claim as new and desire to protect by Letters Patent is:

1. In a valve of the type having a tubular body communicating at one end with an airblast line and having a nozzle at its other end and a latex lining within said tubular body between said airblast line and nozzle, the combination therewith of means for collapsing said latex lining for stopping flow of air under pressure therethrough, comprising a lever actuated arm, said body having a circular opening formed therein adjacent said arm, a padlike closure on said arm configurated to conform to that portion of said tubular body removed to provide the opening therein, means for normally holding said closure in register with the opening in said body, a lever for actuating said arm to force said closure into said tubular body for collapsing the latex lining therein, a latch means on said arm, and a releasable keeper bolt mounted on said body and engageable by said latch when said closure is within said tubular body for maintaining said closure in pinching relation against said latex lining.

2. In a valve of the type having a tubular body communicating at one end with an airblast line and having a nozzle at its other end and a latex lining within said tubular body, the combination therewith of means for collapsing said latex lining for stopping flow of air under pressure therethrough, comprising a lever actuated arm, said body having a circular opening formed therein adjacent said arm, a padlike closure on said arm configurated to conform to the shape of said tubular body, means for normally holding said closure in register with the opening in said body, a lever for actuating said arm to force said closure into said tubular body for collapsing the latex lining therein, latch means on said arm, a releasable keeper bolt mounted on said body and engageable by said latch means when said closure is within said tubular body for maintaining said closure in pinching relation against said latex lining, and manually operated means connected to said releasable keeper bolt for releasing said latch means from engagement with said keeper bolt.

3. In combination with a sand blast nozzle of the type including a tubular housing having a collapsible hose confined within it of means for pinching said collapsible hose for stopping the flow of fluid under pressure therethrough, comprising a hand controlled lever pivotally mounted on said housing and having a cam surface on its fore end, said housing having a circular opening formed therein between its ends on an axis disposed radially of the circular cross section of said housing and in the plane of swing of said lever, an arm pivotally mounted between the fore end of said lever and said opening, a cam lug on said arm engageable with the cam surface on the fore end of said lever, a padlike closure on said arm in an arcuate plane substantially coincident to the arc of swing of said cam lug, said closure being of a circular configuration to fit the opening in said housing and of arcuate configuration cross sectionally to conform to the shape of said tubular housing and normally disposed in alignment therewith to support said collapsible hose in the region of said opening, a keeper bolt mounted on said housing for turning movement about an axis transverse of the plane of swing of said lever and said arm, a spring urged pawl pivotally mounted on the periphery of said arm between said cam lug and said closure and engageable with said keeper bolt when said arm is urged toward said housing upon manipulation of said lever to thereby hold said closure in pinching relation against said collapsible hose, and a spring actuated trigger connected to said keeper bolt for turning the latter to thereby release the spring urged pawl therefrom.

4. In a valve of the tubular body type having a collapsible latex lining communicating with the discharge end of fluid pressure supply line and adapted to be pinched for stopping the flow of fluid under pressure therethrough, the combination with said tubular body of a spring urged operating lever pivotally mounted on said body for movement in a plane including the axis of said tubular body and normally disposed in substantial parallelism therewith, said tubular body having a circular opening formed therein on an axis disposed radially of said body and in the plane of movement of said lever, an arm pivotally mounted on said body between the opening therein and said lever and having a padlike closure formed thereon in the region of said opening, said closure conforming substantially to the contour of said body in the region of said opening, said arm having a cam lug engageable by the fore end of said lever whereby to hold said closure in the opening in said body for supporting said collapsible lining therein in the region of said opening, a spring urged pawl pivotally mounted on the periphery of said arm, and a keeper bolt movably mounted on said body for engagement by said pawl, said keeper bolt having a recess formed therein for receiving the free end of said pawl when said arm is urged toward said body by manipulation of said lever and said closure on said arm is in pinching relation with said collapsible latex lining.

5. In a valve of the tubular body type having a collapsible latex lining communicating with the discharge end of fluid pressure supply line and adapted to be pinched for stopping the flow of fluid under pressure therethrough, the combination with said tubular body of a spring urged operating lever pivotally mounted on said body for movement in a plane including the axis of said tubular body and normally disposed in substantial parallelism therewith, said tubular body having a circular opening formed therein on an axis disposed radially of said body and in the plane of movement of said lever, an arm pivotally mounted on said body between the opening therein and said lever and having a padlike closure formed thereon in the region of said opening, said closure conforming substantially to the contour of said body in the region of said opening, said arm having a cam lug engageable by the fore end of said lever whereby to hold said closure in the opening in said body for supporting said collapsible lining therein in the region of said opening, a spring urged pawl pivotally mounted on the periphery of said arm, a keeper bolt movably mounted on said body for engagement by said pawl, said keeper bolt having a recess formed therein for receiving the free end of said pawl when said arm is urged toward said body by manipulation of said lever and said closure on said arm is in pinching relation with said collapsible latex lining, and a thumb actuated trigger operatively connected to said keeper bolt for moving the recess formed in the latter into a position to unseat the free end of said pawl therefrom whereby said arm is free to return to its normal position under the influence 6. In a sandblast nozzle having a body provided with a tubular passage in which is confined a latex liner in axial alignment with the discharge end of a sandblast line, the combination therewith of means for controlling the flow of compressed air and sand through said latex liner comprising a lever actuated arm pivotally mounted on said body for swinging movement in a plane including the axis of the tubular passage in said body, said body having an opening in its periphery exposing a portion of said latex liner adjacent said arm, a pad on said arm adapted to register with said opening in said body, a lever pivotally mounted on said body for swinging movement in said plane and having a cam surface engageable by said arm under the influence of the liner expanding force of the compressed air and sand passing through said liner, and stop means on said body for engaging the free end of said lever for limiting movement thereof in one direction beyond a point wherein said pad is in register with said opening formed in said body to thereby maintain said expanded latex liner within the confines of the passage formed in said body.

7. In a sandblast nozzle having a body provided with a tubular passage in which is confined a latex liner in axial alignment with the discharge end of a sandblast line, the combination therewith of means for controlling the flow of compressed air and sand through said latex liner comprising a lever actuated arm pivotally mounted on said body for swinging movement in a plane including the axis of the tubular passage in said body, said body having an opening in its periphery exposing a portion of said latex liner adjacent said arm, a pad on said arm adapted to register with said opening in said body, a lever pivotally mounted on said body for swinging movement in said plane and having a cam surface engageable by said arm under the influence of the liner expanding force of the compressed air and sand passing through said liner, and stop means on said body for engaging the free end of said lever for limiting movement thereof in one direction beyond a point wherein said pad is in register with said opening formed in said body to thereby maintain said expanded latex liner within the confines of the passage formed in said body, said cam surface being disposed to bear against said arm upon manipulation of said lever in an opposite direction for urging said pad into said passage and against said latex liner for restricting or collapsing the same.

8. In a valve of the type employed in the art of sandblasting including a latex liner confined within a tubular body in axial alignment with a nozzle and the discharge end of a sandblasting hose; the combination therewith of means for controlling the flow of sandblast material through said latex liner comprising a pair of trunnionlike projections on said body, said body having a circular opening formed therethrough adjacent said projections and in a plane coincident to a line between them, an arm pivotally mounted on said trunnion projections for swinging movement toward and from said opening, a padlike closure on said arm having a circular form adapted to register with said opening and having an arcuate cross section conforming to the arcuate configuration of said tubular body for blocking the opening formed therein and thereby support said latex liner therein against the influence of the pressure of sandblasting material passing therethrough, a manually operable lever pivotally mounted on said trunnionlike projections rearwardly of said arm and having a cam surface adapted to engage said arm for transmitting motion thereto, and stop means on said body engageable by the free end of said lever for limiting movement thereof in one direction under the influence of the pressure of the sandblasting material upon said padlike closure and arm for normally maintaining said padlike closure in register with the opening formed in said body.

9. In a valve of the type employed in the art of sandblasting including a latex liner confined within a tubular body in axial alignment with a nozzle and the discharge end of a sandblasting hose; the combination therewith of means for controlling the flow of sandblast material through said latex liner comprising a pair of trunnionlike projections on said body, said body having a circular opening formed therethrough adjacent said projections and in a plane coincident to a line between them, an arm pivotally mounted on said trunnion projections for swinging movement toward and from said opening, a padlike closure on said arm having a circular form adapted to register with said opening and having an arcuate cross section conforming to the arcuate configuration of said tubular body for blocking the opening formed therein and thereby support said latex liner therein against the influence of the pressure of sandblasting material passing therethrough, a manually operable lever pivotally mounted on said trunnionlike projections rearwardly of said arm and having a cam surface adapted to engage said arm for transmitting motion thereto, stop means on said body engageable by the free end of said lever for limiting movement thereof in one direction under the influence of the pressure of the sandblasting material upon said padlike closure and arm for normally maintaining said padlike closure in register with the opening formed in said body, and a releasable keeper bolt mounted on said body in the region thereof in advance of said opening and in the path of swing of said arm toward and from said opening, and a oneway latch carried by said arm and engageable with said keeper bolt for latching said arm in a position toward said opening for maintaining said padlike closure in pinching relation relative to said latex liner for collapsing the same to obstruct the flow of sandblast material therethrough.

HOWARD A. GREISER.

References Cited in the file of this patent

UNITED STATES PATENTS

| Number | Name | Date |
|---|---|---|
| 1,309,321 | Fairweather | July 8, 1919 |
| 1,701,411 | Kellam | Feb. 5, 1929 |
| 2,009,907 | Teuber | July 30, 1935 |

FOREIGN PATENTS

| Number | Country | Date |
|---|---|---|
| 270,827 | Great Britain | A. D. 1927 |